T. M. CHANCE.
METHOD FOR WASHING COAL AND CONCENTRATING ORES AND MINERALS.
APPLICATION FILED AUG. 27, 1917.
1,392,400.
Patented Oct. 4, 1921.
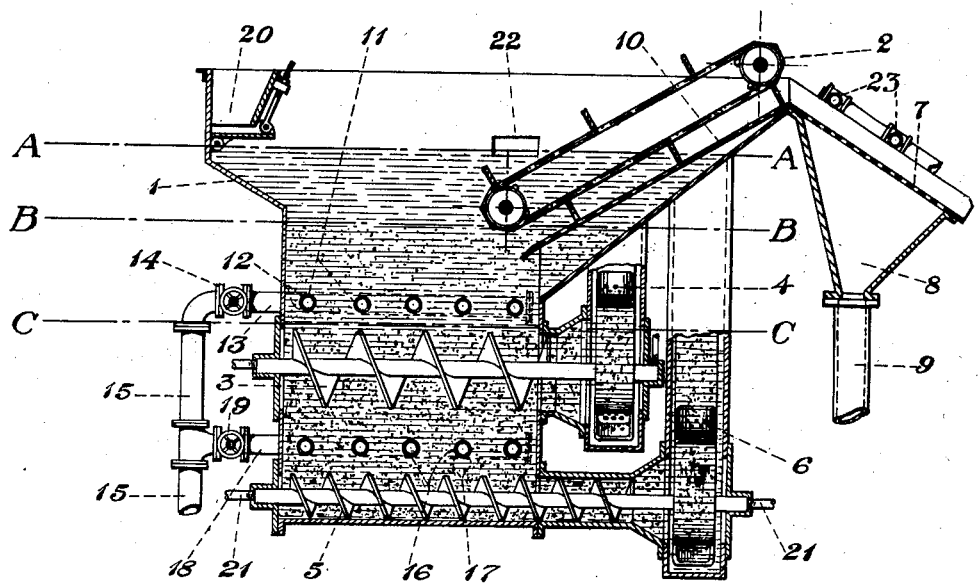
*FIG. 1*
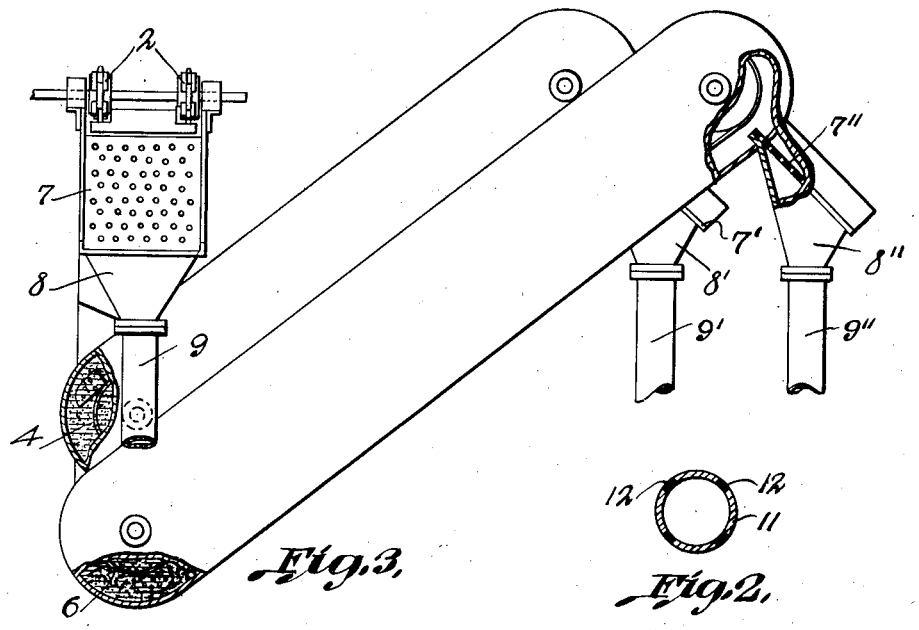
*Fig. 3.*  *Fig. 2.*
WITNESSES:
INVENTOR
Thomas M. Chance

UNITED STATES PATENT OFFICE.

THOMAS M. CHANCE, OF PHILADELPHIA, PENNSYLVANIA.

METHOD FOR WASHING COAL AND CONCENTRATING ORES AND MINERALS.

1,392,400.  Specification of Letters Patent.  Patented Oct. 4, 1921.

Application filed August 27, 1917. Serial No. 188,431.

*To all whom it may concern:*

Be it known that I, THOMAS M. CHANCE, a citizen of the United States, residing at Philadelphia, in the State of Pennsylvania, have invented certain new and useful Improvements in Methods for Washing Coal and Concentrating Ores and Minerals, whereof the following is a specification.

My invention relates to improvements adapted to be used in operating the method of washing coal and concentrating ores disclosed by me in United States Patent 1,224,138 dated May 1, 1917, wherein a fluid mass of relatively high specific gravity, consisting of a mixture of liquid and comminuted insoluble material heavier than the liquid and maintained in a fluidic condition by agitation, is used to separate materials of specific gravity relatively greater than said fluid mass from those of specific gravity equal to or relatively less than said fluid mass. In the practice of the invention described in said patent the separation of several substances of different specific gravities can be accomplished by introducing the material floated or sunk in one such fluid mass into a second fluid mass of higher or lower specific gravity, and if necessary into a third fluid mass and so on until the desired separation is effected. My present invention consists in improvements whereby two or more fluid masses of different specific gravities may be simultaneously employed in a common separating tank or receptacle for such differential separation, the fluid mass of lower specific gravity being superimposed upon that of higher specific gravity. A further object of my invention relates to the employment of such plural fluid masses in conjunction with a body of liquid of less specific gravity superimposed thereon.

For simplicity the word "water" will be used to mean any liquid suitable for the purpose, and the word "sand" will be used to mean any granular insoluble material heavier than the liquid and which will sink readily in said liquid unless maintained suspended in said liquid by agitation.

I have found, as disclosed in said patent, that agitation suitable for the purpose of maintaining the fluid mass can be produced either by energy applied mechanically, (as by stirring arms, etc.) or by energy supplied by liquid under pressure. It is evident that the energy theoretically required will be the same whether applied mechanically or by the introduction of liquid under pressure, but it is also evident that the energy actually required will depend upon the way in which it is applied, because much of the energy applied to effect agitation may be expended in friction and thus become dissipated as heat and have no useful effect in producing the agitation necessary to overcome, or to neutralize, the tendency of the individual particles of the solid matter to settle by gravity.

It is evident that if I use fixed quantities of sand and water as the constituents of such a fluid mass, and mechanically apply agitation sufficient to keep the sand and water thoroughly mixed, the fluid mass will have a definite and fixed specific gravity which is fixed by the relative proportions of sand and water used; but if agitation is applied to such mixture by the introduction of liquid under pressure,—hereinafter for convenience called "hydraulic water,"—the predetermined relations between the proportions of sand and water are disturbed or destroyed, and the control of the specific gravity and volume of the fluid mass to conform to any predetermined required conditions must be accomplished by regulating the use of the hydraulic water to such quantity and to such head or pressure as will secure the desired result.

The most simple and obvious way in which to apply hydraulic water to effect agitation is to introduce it from below (as through a perforate bottom) as an upwardly rising current, or as a series of isolated jets. In effecting agitation in this way, if a given quantity of sand be used, a fluid mass of definite specific gravity is formed and maintained by a definite volume of hydraulic water introduced per unit of time under a definite head or pressure. If the volume of hydraulic water be increased the grains of sand are more forcibly agitated and are forced farther apart and the specific gravity of the fluid mass is correspondingly decreased and the volume of the fluid mass is correspondingly increased,—and vise versa. I have found that agitation giving similar results can be produced by jets of hydraulic water introduced in any desired direction and at any desired height above the bottom of the fluid mass. Such jets may be made to issue from orifices in pipes located in the body of the fluid mass and may be discharged in a vertically downward direction, or at any desired angle, and may be made to produce the agitation necessary to maintain the fluid mass at the desired specific gravity and of the desired volume. When agitation is effected by energy partly applied mechanically and partly applied by means of hydraulic water, the quantity of hydraulic water required to maintain the fluid mass at a certain specific gravity and volume steadily diminishes as the mechanical agitation is increased.

By providing means for closely adjusting the specific gravity of such fluid masses and for maintaining the specific gravity at the desired density, I find it is possible to superimpose upon a fluid mass of high specific gravity another similar fluid mass of less specific gravity, or to superimpose a fluid mass of low specific gravity upon another similar fluid mass of higher specific gravity. If desired, I may maintain a reasonably distinct line of demarcation between the fluid masses of different specific gravities, or I may permit the differences in specific gravities to merge gradually from that of the upper fluid mass to that of the lower fluid mass. It thus becomes possible to create and maintain two or more distinct zones, in each of which a fluid mass can be made to maintain (between certain limits) such specific gravity as may be desired, zones of lighter specific gravity being of course above those of heavier specific gravity. It is evident that the creation and maintenance of such a series of zones of different specific gravities will permit the separation of three or more kinds of material having different specific gravities, similar to the successive treatment of such materials by separate fluid masses of different specific gravities above referred to in said Patent 1,224,138.

We may thus effect the separation of light—and hence low ash—coal, valuable for coking, from the heavier and higher ash coal, and this latter in turn from the "bone" and "laminated" coal (very impure coal and interstratified coal and slate), this "bone" or "laminated" coal being in turn separated from waste such as fire-clay, slate, shale, pyrite, etc., each of these several classes of material, except the waste, being separated by floating in a fluid mass through which it is not heavy enough to sink, and from which by suitable appliances it can separately be removed. The separation of barren or worthless gangue or rock, from gangue containing ore ("middlings", to be recrushed to free the ore) and the separation of "middlings" from clean or high-grade ore, and the separation of the constituents of complex ores consisting of gangue and two or more minerals of different specific gravities may be likewise thus accomplished.

If means be provided for the accurate and definite control of the degree of agitation, that is, if the agitation be uniform and constant, so that a fluid mass of definite and practically constant specific gravity and volume is produced and maintained, it is possible to superimpose upon such fluid mass a body of liquid of less specific gravity than that of said fluid mass, and the use of a body of liquid thus superimposed upon a single fluid mass employed in making simple two-part separations is described in a co-pending application for patent filed by me, of even date herewith, Serial Number 188,430, for method and apparatus for washing coal and concentrating ores, in which said application I have broadly claimed the combination of a body of liquid superimposed upon a fluid mass of the described type; I therefore herein have limited my claims to combinations consisting of compound fluid masses of the types herein described, with or without a body of liquid superimposed thereon. Such a body of water (liquid) may likewise be superimposed upon a compound fluid mass of the type described herein and may be used to wash off from the separated materials that are removed from said fluid mass, particles of sand mixed therewith. This superincumbent water may thus be used in the separating tank as wash water, the sand that is washed from the separated materials immediately sinking through the water to become reincorporated as a part of the fluid mass.

This superincumbent water may also be advantageously used to remove from the materials to be washed or concentrated, prior to their introduction into the fluid mass for separation, substances such as mud, slimes, dirt and the like, as well as materials lighter than water such as wood, rope, yarn, cotton, cloth, burlap, paper, etc., that may be mixed with the ore, coal or other material that is to be washed or concentrated by introduction into the said fluid mass; and also to effect the separation of such substances and material after the materials to be washed or concentrated by introduction into the said fluid mass have been introduced into said mass.

My invention may be carried out in an apparatus, the essential elements of which are diagrammatically shown by Figure I, which is a central, vertical cross-section of an apparatus designed for use with a compound fluid mass consisting of two zones of different specific gravities with a body of liquid superimposed upon said fluid mass. The drawing Fig. II shows an enlarged cross-section of one of the agitating elements used in the operation of the device shown in Fig. I. Like numbers indicate like parts in both of the drawings. Fig. III is an end view showing the dewatering screens 7' and 7''.

In the drawing Fig. I, 1 is a receptacle, conventionally shown as a tank, adapted to contain a compound fluid mass, consisting of two zones of an agitated mixture of liquid and comminuted insoluble solid matter heavier than said liquid, and a body of liquid superimposed upon said compound fluid mass. The upper surface of said body of liquid is indicated by the dot and dash line A—A, the upper surface of the low specific gravity zone of said compound fluid mass by the line B—B and that of the high specific gravity zone of said compound fluid mass by the line C—C. The water occupying the space between lines A—A and B—B is indicated by the conventional broken parallel lines used to indicate liquid; the lighter or uppermost fluid mass occupying the space between lines B—B and C—C is diagrammatically indicated by the parallel lines representing liquid with the addition of stippling to indicate the grains or particles of the solid constituent of said fluid mass; the heavier or lower fluid mass occupying the space below the line C—C is indicated in the same manner except that the stippling shows the presence of a larger percentage of the solid constituent of said fluid mass, than is shown in the lighter fluid mass superimposed thereon. The tank 1 is provided with flight conveyer 2 for the removal of the material floated by the upper zone of the compound fluid mass, conveyer 3 and elevator 4 for the removal of material of intermediate specific gravity sinking in zone B—B and floating in zones C—C and conveyer 5 and elevator 6 for the removal of the heavy material that sinks in both zones of the compound fluid mass. A screen 7 is provided for the removal of parts of the fluid mass and water adhering to the light material removed by conveyer 2, said screen 7 being provided with boot 8 and conduit 9 for the collection of the comminuted solid material and water removed by said screen. It will be understood that the elevators 4 and 6 are likewise provided with dewatering screens similar to the screen 7, shown in the end elevation, Fig. III, and indicated by the numbers 7' and 7''. It will further be understood that the portion of the fluid mass and water reclaimed by said dewatering screens may be returned to the tank 1 by suitable elevating devices. A chute 10 is provided for flight conveyer 2 and this chute may be advantageously provided with perforations as shown, to permit the reclaiming of a considerable portion of the comminuted solid material and water without removal from the tank 1.

Pipes 11 provided with perforations 12 and connected through manifold 13 and cut-off valve 14 to the hydraulic line 15 permit the introduction of hydraulic water for the agitation of the zone B—B of the compound fluid mass, while pipes 16, provided with perforations 17, and connected through manifold 18 and cut-off valve 19 to said hydraulic line 15 permit the introduction of hydraulic water for the agitation of the lower zone C—C of the compound fluid mass, it being understood that the hydraulic line 15 is connected to a suitable source of supply of liquid under pressure.

A feeding device is diagrammatically shown by the numeral 20 and pipes, as at 21, are shown for the introduction of water under pressure to the bearings of the conveyer shafts that operate in the fluid mass to prevent cutting by the same. An overflow for excess liquid is shown at 22 and means for applying wash water to remove portions of the fluid mass adhering to the material passing over the screens 7 are shown by the spray pipes 23, it being understood that said pipes are connected to a suitable source of liquid supply. It will of course be understood that the dewatering screens provided for elevators 4 and 6 may be likewise provided with spray pipes similar to those just described.

The operation of the apparatus shown in Fig. I is as follows:

The tank 1 being filled to the proper level with a mixture of comminuted insoluble solid matter and liquid, agitation thereof is effected by the hydraulic water, issuing through apertures 12 and 16 of pipes 11 and 17 and under the control of valves 14 and 19 respectively. Differential agitation of the comminuted solid material and liquid is thus effected and a compound fluid mass is thereby produced. The specific gravity of the upper zone B—B of this compound fluid mass will be dependent upon the agitation produced by the jets of hydraulic water issuing from holes 12 in pipes 11 and also to a certain extent by agitation effected by the jets from the lower hydraulic water pipes 16, while that of the lower zones C—C of the compound fluid mass will be dependent upon the agitation produced by the jets from the hydraulic water pipe 16, these jets issuing from holes 17. Some further agitation is of course produced by the operation of conveyers 3 and 5 and bucket elevators 4 and 6. The agitation produced by the conveyers 3 and 5 will of course depend upon the pitch and size of the blades or wings of the screw and the speed at which they are operated. If desired they may be especially designed, not only to effect transfer of the materials but also to act as mechanical agitators, and are intended to be diagrammatically illustrative of such, and to illustrate the use of combined hydraulic and mechanical agitation in the practice of my invention. They can of course be operated at any desired speed, can be made large or small, and operated at any desired angle from the horizontal.

If a mixture of sand and water be employed for producing the compound fluid mass in the tank 1 and if a mixture of coal, bony coal and slate be introduced into this compound fluid mass, by feeding device 20,—the upper zone B—B of said fluid mass being maintained at about 1.45 specific gravity and the lower zone at about 1.70 specific gravity,—the light pure coal will float in the upper portion of the zone B—B and will be removed therefrom by the flight conveyer 2, being transported up the chute 10 and through the body of clear water resting upon the compound fluid mass, the top line of which is indicated by the dot and dash line A—A. This transportation of the washed coal through the body of liquid A—A will of course result in washing off a considerable portion of any comminuted solid material composing the fluid mass that may be mixed with the washed coal, this solid material returning to the fluid mass in tank 1 through the apertures of screen 10. The remaining portion of the comminuted material, together with the entrained water, will be removed largely by passage over dewatering screen 7, and may be returned by conduit 9 to the tank 1.

The heavier bony coal will sink through this upper zone B—B but will float in the upper portion of the zone C—C of the compound fluid mass and will be removed therefrom by screw conveyer and bucket elevator 4, while the heavy slate, pyrite and other refuse sinking through the lower zone C—C of the fluid mass will be caught by conveyer 5 and delivered to bucket elevator 6, being thus removed from the fluid mass in tank 1. It will of course be understood that conveyers 3 and 5 may be driven by bucket elevators 4 and 6 as shown, or that separate drives may be provided.

The light material having a specific gravity less than that of water, such as wood chips, cotton waste, etc., will float on the top surface A—A in the body of liquid in tank 1 and will be removed through liquid overflow 22.

The specific gravities noted above must of course be varied to meet the conditions of the separation to be made, within the physical limits of the materials composing the fluid mass, in the case specifically referred to the densities are suitable for some grades of soft coal, and it will of course be understood that the specific gravity necessary for use with other materials, such as metalliferous ores, may be quite different from those noted.

The elevators 4 and 6, for removing the separated materials from the body of the fluid mass, are diagrammatically shown as bucket elevators, but it will be understood that any desired form of elevating device may be used for performing the functions of these elements of the apparatus. If bucket elevators or flight conveyers are used for this purpose, the buckets or flights would preferably be of the perforated type employed in dewatering elevators and conveyers. Similarly, flight conveyer 2 may be replaced by any desired form of elevating device.

Fig. II is an enlarged cross-section of one of the hydraulic water pipes 11 and shows the method of providing apertures 12 for producing the hydraulic jets that are used in agitating the compound fluid mass. It will of course be understood that the construction of pipes 16 is similar to that of pipes 11 and that the jet apertures 12 and 17 may be formed to play in any desired direction, it not being essential to follow the particular construction shown in this Fig. II.

It will also be clear that the arrangement of hydraulic water pipes 11 and 16, together with jets 12 and 17, need not always be used in the operation of my invention and that many other means to effect agitation, as exemplified by Patent No. 1,224,138 above quoted, may be readily employed by any skilled in the art.

It will be understood that in constructing apparatus for the use of my invention I do not confine myself to the particular form or style used in the drawings to illustrate the application of my method, as it is evident that in constructing such apparatus a great variety of appliances in common use for handling solids and for handling liquids may advantageously be employed for like purposes in carrying out my invention.

In U. S. Patent 1,224,138, a number of modifications of apparatus for employing mechanical, hydraulic and pneumatic agitation are shown and described, together with various appliances for feeding the materials to be separated into the fluid mass, removing the separated materials from said fluid mass and recovering the portions of said fluid mass adhering to said materials after such removal. It will be understood that such modifications as may be applicable to my present invention may be employed by any skilled in the art, the apparatus necessary to the employment of my invention generally comprising the following elements:— a receptacle adapted to contain a compound fluid mass, said mass consisting of two or more zones of different specific gravity of an agitated mixture of comminuted solid material and liquid, a body of liquid superimposed upon said fluid mass, means for differentially agitating said fluid mass, means for introducing the materials to be separated therein, and means for the removal of the separated materials therefrom after separation has been accomplished. It will of course be understood that if mechanical methods of agitation are employed, devices similar to those described and shown in Patent No. 1,224,138 may be substituted for the agitating screw conveyers 3 and 5 of Fig. I, of this application, agitators in the upper zones producing or assisting in producing a low density fluid mass and those in lower zones a higher density fluid mass.

If my invention be employed in the concentration of metalliferous ores, the heaviest material will generally be the economic mineral that it is desired to save and the material floated in the intermediate specific gravity zones may be either "middlings" or minerals of lower gravity than those that sink in the lowest zone. Such a differentiation might be made, for example, in separating zinc blend and galena, the galena sinking to the bottom of the fluid mass and the blend at an intermediate point. In cases of this kind comminuted "middlings" or concentrates themselves may be employed as a comminuted solid material composing the fluid mass, and such use of these materials is referred to in the above patent. A further advantage of the use of such materials for producing the fluid mass is found in the fact that I may employ comminuted material of high specific gravity, such as galena and the like, to produce the lower zone of the compound fluid mass and lighter comminuted material, such as magnetite, zinc blend, galena "middlings" etc. for producing the upper zones. It will be clear that under such conditions the specific gravity of the various zones will depend on both the degree of agitation in any particular zone and also upon the specific gravity of the comminuted solid material used in that particular zone for the production of the compound fluid mass. It will be necessary under such conditions to carefully proportion the agitation to the specific gravity of the comminuted materials forming each particular zone in the compound fluid mass so that the desired specific gravity of each zone of said fluid mass may be maintained. It will be understood that differences in size of comminuted material of any certain specific gravity used to form the fluid mass may likewise affect the specific gravity of the various zones composing the fluid mass and that this defference in size will also require proper proportioning of the agitation to attain the desired specific gravities in said different zones.

Under some conditions it may be advantageous to apply hydraulic water for agitation in the vicinity of the elevating devices used for removing the separated materials, such agitation being useful in attaining and maintaining the fluidic properties of those portions of the fluid mass surrounding said elevating devices,—e. g., when the apparatus is to be started and the mixture used for forming said fluid mass is at rest,—and such additional agitation may be provided by the introduction of hydraulic agitating devices similar to those described for the agitation of the main fluid mass in the drawing Fig. I.

While in the embodiment of my invention shown in the drawing Fig. I, a body of liquid is provided, superimposed upon the compound fluid mass contained in the separating tank 1, it will be understood that I do not limit myself to the employment of such a body of liquid and that in the operation of my invention this body of liquid may often be omitted, such omission being entirely within the scope of my invention. For example, if the discharge of the separated material of lowest specific gravity be effected by the overflow of the upper zone of the compound fluid mass itself,—in a manner similar to that shown in some forms of apparatus illustrated in Patent 1,224,138 above referred to,—the compound fluid mass alone need be contained in the separating tank and the supcrincumbent body of liquid may be dispensed with.

It will of course be understood that the location of the top surface of the zones of different specific gravity of the fluid mass, indicated by the dot and dash lines B—B and C—C, and also the top of the body of liquid, indicated by the dot and dash line A—A, in Fig. I, may be varied to meet the requirements of the particular separation to be made and are not to be considered as fixed at the points shown by said drawing.

By the term "fluid mass" as used in the claims hereof I mean to include any agitated mixture of comminuted solids and liquid which when properly agitated will approach the properties and fluidity of a true liquid but that requires continuous agitation to preserve such fluidic properties.

Having described my invention I claim:

1. A method of separating materials by means of differences in their specific gravities which consists in immersing said materials in a compound fluid mass composed of liquid and particles of solid matter heavier than the liquid and maintained by agitation in zones of relatively different specific gravities; in permitting the materials of relatively low specific gravity to rise to and float in the upper portion of the low density zones of said fluid mass; in permitting the materials of relatively higher specific gravity to rise to and float in the upper portion of the high density zones of the fluid mass; in permitting the materials of highest specific gravity to sink to the lower portion of the highest density zone; in separately removing the materials thus separated from said compound fluid mass and in transporting the materials of low specific gravity thus removed through a body of liquid superimposed upon said compound fluid mass; and thereby removing some of the comminuted solid matter of said mass mixed with said separated materials.

2. A method of separating materials by means of differences in their specific gravities which consists in immersing said materials in a compound fluid mass composed of liquid and particles of solid matter heavier than the liquid and maintained by agitation in zones of relatively different specific gravities; in permitting the materials of relatively low specific gravity to rise to and float in the upper portion of the low density zones of said fluid mass; in permitting the materials of relatively higher specific gravity to rise to and float in the upper portion of the high density zones of said fluid mass; in permitting the materials of highest specific gravity to sink to the lower portion of the highest density zone; in separately removing the materials thus separated from said fluid mass and in transporting the materials thus removed through a body of liquid superimposed upon said compound fluid mass, and thereby removing some of the comminuted solid matter of said mass mixed with said separated materials.

3. A method of washing coal which consists in feeding said coal into a compound fluid mass composed of an agitated mixture of sand and water and maintained by agitation in zones of relatively different specific gravities; permitting the coal of relatively low specific gravity to rise to and float in the upper portion of the low density zone of said fluid mass; permitting the coal, bony coal and impurities of relatively higher specific gravity to rise to and float in the upper portion of the high density zone of said fluid mass; permitting the impurities of highest specific gravity to sink to the lower portion of said fluid mass and separately removing the coal and impurities thus separated from said compound fluid mass.

4. A method of washing coal which consists in feeding said coal into a compound fluid mass composed of an agitated mixture of sand and water and maintained by agitation in zones of relatively different specific gravities; permitting the coal of relatively low specific gravity to rise to and float in the upper portion of the low density zone of said fluid mass; permitting the coal, bony coal and impurities of relatively higher specific gravity to rise to and float in the upper portion of the high density zone of said fluid mass; permitting the impurities of highest specific gravity to sink to the lower portion of said fluid mass; separately removing the coal and impurities thus separated from said compound fluid mass and in transporting the coal thus removed through a body of liquid superimposed upon said fluid mass, and thereby removing some of the comminuted solid matter of said mass mixed with said separated coal.

5. A method of washing coal which consists in feeding said coal into a compound fluid mass composed of an agitated mixture of sand and water and maintained by agitation in zones of relatively different specific gravities; permitting the coal of relatively low specific gravity to rise to and float in the upper portion of the low density zone of said fluid mass; permitting the coal and impurities of relatively higher specific gravity to rise to and float in the upper portion of the high density zone of said fluid mass; permitting the impurities of highest specific gravity to sink to the lower portion of said fluid mass; separately removing the coal and impurities thus separated from said compound fluid mass and in transporting the coal and impurities thus removed through a body of liquid superimposed upon said fluid mass, and thereby removing some of the comminuted solid matter of said mass mixed with said separated coal and impurities.

6. A method of washing coal which consists in feeding said coal into a compound fluid mass composed of liquid and particles of solid matter of specific gravity greater than that of the liquid and than that of the coal; maintaining said compound fluid mass in superposed zones of different specific gravities; causing the coal of relatively low specific gravity to rise to and float in the upper portion of the low density zone of said fluid mass; causing the coal, bony coal and impurities of relatively higher specific gravity to rise to and float in the upper portion of the high density zone of said fluid mass; causing the impurities of higher specific gravity to sink to the lower portion of said fluid mass and separately removing the coal and impurities thus separated from said compound fluid mass.

In testimony whereof I have hereunto signed my name at Philadelphia, Pennsylvania, this 24th day of August, 1917.

THOMAS M. CHANCE.

Witnesses:
E. R. BARNARD,
J. H. QUINN.